(12) United States Patent
Wright

(10) Patent No.: US 6,724,758 B1
(45) Date of Patent: Apr. 20, 2004

(54) STAGE SPECIFIC DILATION IN MULTI-STAGE INTERCONNECTION NETWORKS

(75) Inventor: Ian M. Wright, Woodside, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/467,737

(22) Filed: Dec. 20, 1999

(51) Int. Cl.$^7$ .......................... H04Q 11/00; H04L 12/28
(52) U.S. Cl. ...................... 370/388; 370/400; 370/419; 370/389
(58) Field of Search ................................ 370/386, 387, 370/388, 389, 400, 406, 410, 411, 412, 413, 414, 415, 416, 417, 418, 419, 420, 232, 233, 234, 395, 395.4, 395.41

(56) References Cited

U.S. PATENT DOCUMENTS

| | | | | |
|---|---|---|---|---|
| 5,488,432 A | * | 1/1996 | Guillon et al. ............... | 348/717 |
| 5,577,035 A | * | 11/1996 | Hayter et al. ............. | 370/395.4 |
| 5,610,921 A | | 3/1997 | Christensen ............. | 370/395.4 |
| 5,668,812 A | | 9/1997 | Akiyoshi et al. ........... | 370/474 |
| 5,724,352 A | * | 3/1998 | Cloonan et al. ............ | 370/395 |
| 5,726,985 A | | 3/1998 | Daniel et al. ................ | 370/382 |
| 5,734,656 A | | 3/1998 | Prince et al. ............... | 370/401 |
| 5,872,787 A | * | 2/1999 | Cooperman et al. ........ | 370/412 |
| 5,896,380 A | * | 4/1999 | Brown et al. ............... | 370/388 |
| 5,898,687 A | | 4/1999 | Harriman et al. ........... | 370/390 |
| 5,898,688 A | | 4/1999 | Norton et al. ............... | 370/362 |
| 5,940,389 A | * | 8/1999 | Yang et al. ................. | 370/380 |
| 5,949,778 A | * | 9/1999 | Abu-Amara et al. ........ | 370/388 |
| 6,157,643 A | * | 12/2000 | Ma ............................ | 370/389 |
| 6,343,075 B1 | * | 1/2002 | Klausmeier et al. ........ | 370/388 |

OTHER PUBLICATIONS

"6 and 12 Port DS3 Line Card for Cisco 12000 Series Routers", http://www.cisco.com/warp/public/cc/cisco/mkt/core/12000/prodlit/ocelt_ov.htm, ©1992–1999, 6 pps.

(List continued on next page.)

Primary Examiner—Hanh Nguyen
(74) Attorney, Agent, or Firm—Campbell Stephenson Ascolese LLP

(57) ABSTRACT

Speed-up is implemented only in one or more portions of a network that would otherwise experience contention (i.e. when operated without speed-up). For example, an initial stage of a multi-stage interconnection network (MIN) is kept undilated while dilating at least a portion of a later stage. The dilated later stage eliminates or reduces contention, by receiving more traffic than traffic otherwise received by an undilated later stage. In one example, all output ports in the initial stage of a MIN are kept undilated, while one or more input ports of a later stage are dilated. In one implementation, the MIN has stages identified by a stage number that is in the range 0 to N−1, wherein N is the total number of stages, and each stage has output ports dilated by a factor "d" and the relation between number n of links in the output port of a stage and the stage's stage number I is $n=d^I$. For example, in a three stage network having dilation-2 routing components, the initial stage has one link in each input port and two links in each output port, the center stage has two links in each input port and has four links in each output port, and the final stage has four links in each input port and eight links in each output port. Each additional link that is added for dilation is configured to carry different traffic from another link in the same port. Note that instead of dilation by increasing the number of lines, traffic carrying capacity can be increased by clocking a single link at a higher frequency.

5 Claims, 5 Drawing Sheets

OTHER PUBLICATIONS

Chong et al., "Multipath Fault Tolerance in Multistage Interconnection Networks", http://www.above–identified.mit.edu/projects/transit/tn48/tn48.html, MIT Transit Project, Transit Note #48, 1991–1993, 18 pps.

"Cisco 12000 Series Gigabit Switch Router", Cisco Systems, Inc., http://www.cisco.com/warp/public/cc/cisco/mkt/core/12000/prodlit/12atm_ov.htm, ©1992–1999, 11 pps.

"Cisco 12000 Series Gigabit Switch Router Asynchronous Transfer Mode Line Cards", Cisco Systems, Inc., http://www.cisco.com/warp/public/cc/cisco/mkt/core/12000/prodlit/12atm_ds.htm, ©1992–1999, 7 pps.

"Cisco 12000 Series Gigabit Switch Router Channelized OC–12 Line Card", http://www.cisco.com/warp/public/cc/cisco/mkt/core/12000/prodlit/12gsr_ov.htm, ©1992–1999, 9 pps.

"Cisco OC–3/STM–1 Packet–over–SONET/SDH Line Card for Cisco 12000 Series Routers", http://www.cisco.com/warp/public/cc/cisco/mkt/core/12000/prodlit/lcard_ds.htm, ©1992–1999, 7 pps.

"Cisco 12000 Series Gigabit Switch Router Channelized OC–12/STS3 Line Card", http://www.cisco.com/warp/public/cc/cisco/mkt/core/12000/prodlit/12ocs_ov.htm, ©1992–1999, 8 pps.

"Cisco 12000 Series Gigabit Switch Router (GSR) Gigabit Ethernet Line Card", http://www.cisco.com/warp/public/cc/cisco/mkt/core/12000/prodlit/gspel_ov.htm, ©1992–1999, 8 pps.

"Cisco OC–48c/STM 16 Layer 3 Packet–over–SONET Line Card for Cisco 12000 Series Routers", http://www.cisco.com/warp/public/cc/cisco/mkt/core/12000/prodlit/oc48c_ov.htm, ©1992–1999, 11 pps.

"Cisco 12000 Series Gigabit Switch Router Eight–Port Fast Ethernet Line Card", http://www.cisco.com/warp/public/cc/cisco/mkt/core/12000/prodlit/grs8_ov.htm, ©1992–1999, 8 pps.

Kruskal et al., "The Performance of Multistage Interconnection Networks for Multiprocessors", IEEE Transactions on Computers, vol. 32, No. 12, Dec. 1983, pp. 1091–1098.

"OC–48/STM–16 Packet–over–SONET/SDH Line Card for the CIsco 12000 Series GSR", http://www.cisco.com/warp/public/cc/cisco/mkt/core/12000/prodlit/oc48c_ds.htm, ©1992–1999, 8 pps.

"Quad OC–12/STM–4 Packet–over–SONET/SDH Line Card for the Cisco 12000 Series GSR", http://www.cisco.com/warp/public/cc/cisco/mkt/core/12000/prodlit/4oc12_ds.htm, ©1992–1999, 8 pps.

"Six and 12–Port DS3 Line Card for Cisco 12000 Series Routers", http://www.cisco.com/warp/public/cc/cisco/mkt/core/12000/prodlit/ocelt_ds.htm, ©1992–1999, 6 pps.

* cited by examiner

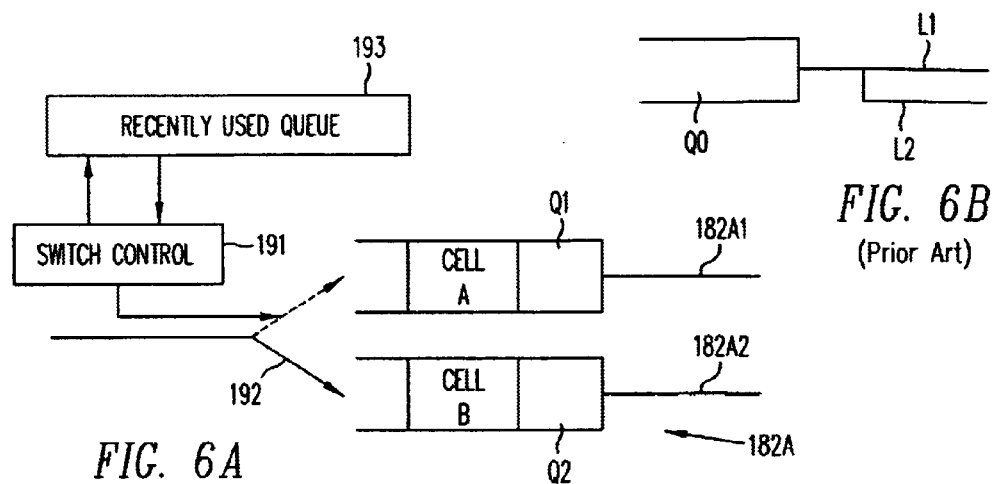
FIG. 6A
FIG. 6B (Prior Art)
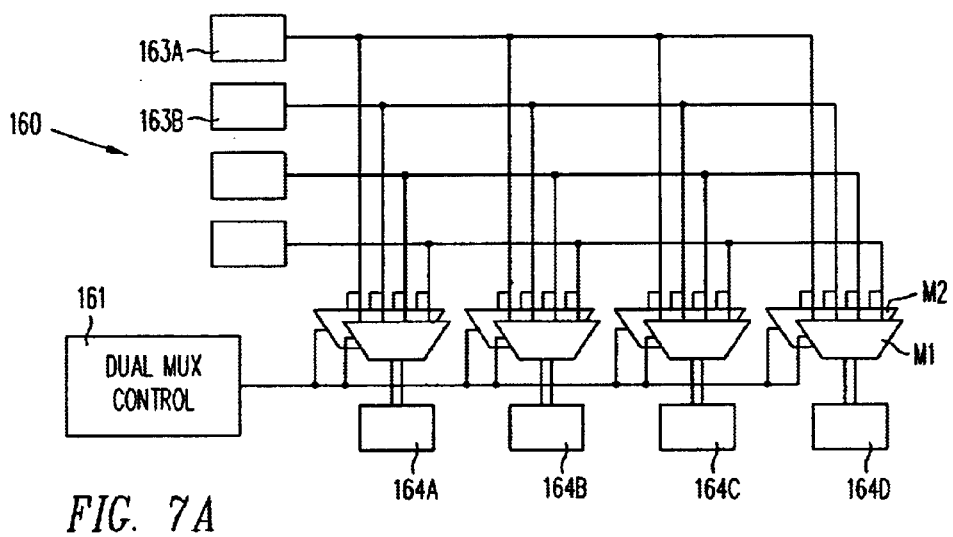
FIG. 7A
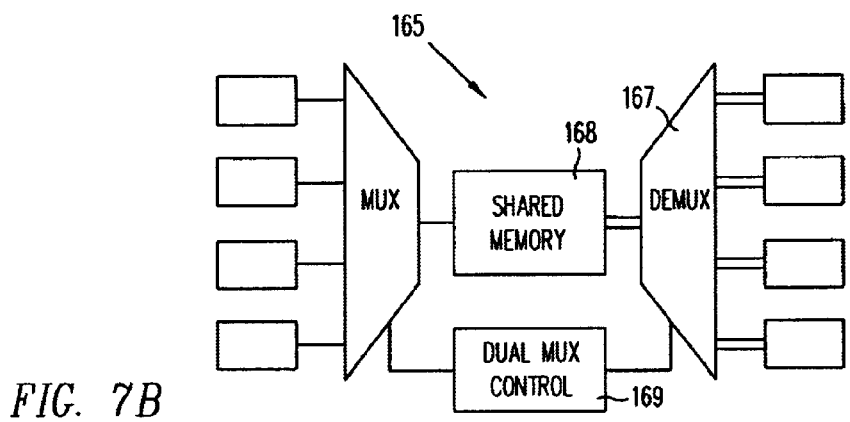
FIG. 7B

STAGE SPECIFIC DILATION IN MULTI-STAGE INTERCONNECTION NETWORKS

BACKGROUND

Interconnection networks are commonly used in many different applications, such as connection of internal lines in very large-scale integration (VLSI) circuits, wide area computer networks, backplane lines, system area networks, telephone switches, internal networks for asynchronous transfer mode (ATM) switches, processor/memory interconnects, interconnection networks for multicomputers, distributed shared memory mulitprocessors, clusters of workstations, local area networks, metropolitan area networks, and networks for industrial applications, as noted in page 1 of the book entitled "Interconnection Networks An Engineering Approach" by Jose Duato, Sudhakar Yalamanchili and Lionel Ni, published by IEEE Computer Society Press, Los Alamitos, Calif. 1997, which book is incorporated by reference herein in its entirety.

Examples of ATM switches are described in, for example, U.S. Pat. Nos. 5,898,688, 5,898,687, 5,734,656, 5,726,985, 5,668,812, and 5,610,921 each of which is incorporated by reference herein in its entirety. Moreover, the following three books: (1) by A. S. Acampora, entitled "An Introduction to Broadband Networks" published by Plenum Press, in 1994, (2) by R. Perlman, entitled "Interconnections: Bridges and Routers" published by Addison-Wesley, in 1992, and (3) by P. E. Green, entitled "Network Interconnection and Protocol Conversion" published by IEEE Press, in 1988 are each incorporated by reference herein in their entirety.

One group of interconnection networks, known as "multistage interconnection networks" (MINs) connect input ports of a network to output ports through a number of stages of switches, where each switch is a crossbar network. The crossbar network is normally configured by a central controller that establishes a path from an input port to an output port. However, in asynchronous multiprocessors, centralized control and permutation routing are infeasible, and a routing algorithm is used to establish a path across the multiple stages, as noted in the above-described book at pages 19–20.

Also as noted in the above-described book at page 19, although many MINs have an equal number of input and output ports, "[t]hese networks can also be configured with the number of inputs greater than the number of outputs (concentrators) and vice versa (expanders)." One example of such an MIN uses crossbar routing switches having an equal number of inputs and outputs, although the number of logically equivalent outputs in each direction can be greater than one, as described in an article entitled "Multipath Fault Tolerance in Multistage Interconnection Networks" by Fred Chong, Eran Egozy, Andre DeHon and Thomas Knight, Jr., MIT Transit Project, Transit Note #48, 1991–1993, available from the Internet at http://www.ai.mit.edu/projects/transit/tn48/tn48.html, which article is incorporated by reference herein in its entirety. As illustrated in an unlabeled figure (the figure on page 3) in the just-described article, "[a] multipath MIN [is] constructed from 4×2 (inputs×radix) dilation-2 crossbars and 2×2 dilation-1 crossbars. Each of the 16 endpoints has two inputs and outputs for fault tolerance. Similarly, the routers each have two outputs in each of their two logical output directions. As a result, there are many paths between each pair of network endpoints."

Note that the MIN of the just-described article appears to be limited to fault tolerance, because the article states (under the heading "Routing" on page 4) "[o]ur fault tolerance results described below are independent of the details of routing and fault identification. That is, routing can be circuit-switched or packet-switched using any number of routing strategies. The fault tolerance results only depend on network topology and the routers' ability to use their redundant connection in each logical direction to avoid faults." Note also that the just-described MIN was implemented using "[a]n RN1 routing component [that] can be configured to act as a single 8-input, radix 4, dilation 2 routing component or as a pair of independent 4-input, radix-4, dilation 1 routing components."

The above-described article states (under the heading "Dilated Non-Interwired Network" on page 4) that "dilated networks . . . connect all outputs in a given logical direction to the same physical routing component in the subsequent stage of the network. The topology is thus identical to the corresponding non-dilated bidelta network. . . . Such networks gain performance by having multiple paths." Moreover, the article states (under the heading "Discussion" on page 16) "[a]lthough we have concentrated upon the fault tolerance of multipath networks, these networks also perform well under unbalanced loading. Intuitively, the effects of hot-spots are very similar to component failures."

See also the following articles each of which is incorporated by reference herein in its entirety: (1) Clyde P. Kruskal and Marc Snir, "The Performance of Multistage Interconnection Networks for Multiprocessors" published in *IEEE Transactions on Computers*, C-32(12):1091–1098, December 1983; (2) Clyde P. Kruskal and Marc Snir, "A Unified Theory of Interconnection Network Structure" published in *Theoretical Computer Science*, pages 75–94, 1986; (3) Robert Grondalski, "A VLSI Chip Set for Massively Parallel Architecture" published in *IEEE International Solid-State Circuits Conference*, pages 198–199, 1987; and (4) K. Y. Eng et al., "A Growable Packet (ATM) Switch Architecture: Design Principles and Applications" published in *IEEE Transactions on Communications*, vol. 40, No. 2, Feb. 1992, pp. 423–430.

SUMMARY

In accordance with the invention, an apparatus and method increase the data rate(s) in one or more portions (also called "later portions") of a communications network, while maintaining a normal data rate in one or more other portions (also called "earlier portions") that supply traffic to the just-described later portion(s). Depending on the implementation, a later portion that is being speeded up can include an intermediate stage or the final stage of a multistage interconnection network (MIN), or can include two or more such stages (also called "later stages"). Therefore, speed up in only a portion of a MIN is implemented depending on location of the portion relative to input ports of the MIN. The just-described MIN is preferably of the connection-less type (e.g. packet-switched or cell-switched), although connection-oriented MINs (e.g. circuit-switched) can also be differentially speeded-up.

Stage specific speed-up of a MIN reduces (or even avoids) traffic contention that otherwise occurs when a disproportionate amount of traffic temporarily travels to a common destination. At the same time, stage specific speed-up reduces costs that are otherwise incurred when all portions of a MIN are speeded up. Therefore, a network that is speeded up in only a later portion (also referred to as "differentially-speeded-up network"; e.g. having a normal speed initial stage and a speeded-up final stage) has the advantage of reducing traffic contention, while being less expensive than a network that is speeded-up in all portions.

In one embodiment, stage-specific speed up (wherein only later portions are speeded up) is used in a MIN that has at least two stages: an earlier stage to supply traffic (regardless of destination) to a later stage, wherein the later stage converges the traffic based on destination. Speed-up of a later portion of a MIN can be implemented by clocking a line faster in one or more output ports of a stage, as compared to an input port of the same stage. Alternatively, the speed-up can be implemented by providing one or more additional lines in a stage's output ports (so an output port has lines greater in number than lines in an input port of the same stage). Note that the just-described additional lines carry different traffic, as opposed to multiple lines in a fault tolerant MIN that are used in a redundant manner to carry the same traffic. Irrespective of whether multiple lines or faster clocked lines are used in an output port, such an output port carries more traffic than the input port of the same stage, thereby to increase the speed of the output port.

In one embodiment, an MIN has stages identified by a stage number that is in the range 0 to N−1, wherein N is the total number of stages, and each stage has output ports speeded-up by a factor "d", and the speed-up of output port of any stage with stage number I is $n=d^I$. For example, in a three stage network having double speed components, the initial stage output ports have a normal speed, the center stage output ports have twice the normal speed, and the final stage output ports have four times the normal speed. In a variant of the just-described example, the initial stage output ports have normal speed, the center stage output ports have twice the normal speed, and the final stage output ports also have twice the normal speed.

If additional lines are used to implement speed up in the three-stage network, the center stage output port has multiple physically-distinct but logically-identical lines that are coupled to the final stage. When a number of packets (or cells) are to be transferred to the same destination by a center stage output port, the port distributes the packets (or cells) evenly among the physically-distinct but logically-identical lines. In one implementation, such a port statistically multiplexes traffic on to the logically-identical lines by saving in memory the identity of line(s) which have been used in a previous cycle, so that the next packet (or cell) is transferred to a line that was not used (or used least) in the previous cycle, thereby to ensure even distribution over time.

BRIEF DESCRIPTION OF THE DRAWINGS

FIGS. 6A and 6B illustrate, in low level block diagrams, storage elements coupled to multiple lines of a dilated port that respectively carry different traffic in one embodiment, and that carry the same traffic in prior art fault tolerant networks.

FIGS. 7A and 7B illustrate, in low level block diagrams, exemplary network elements having only their respective later portions dilated, in accordance with the invention.

DETAILED DESCRIPTION

Figure 1:
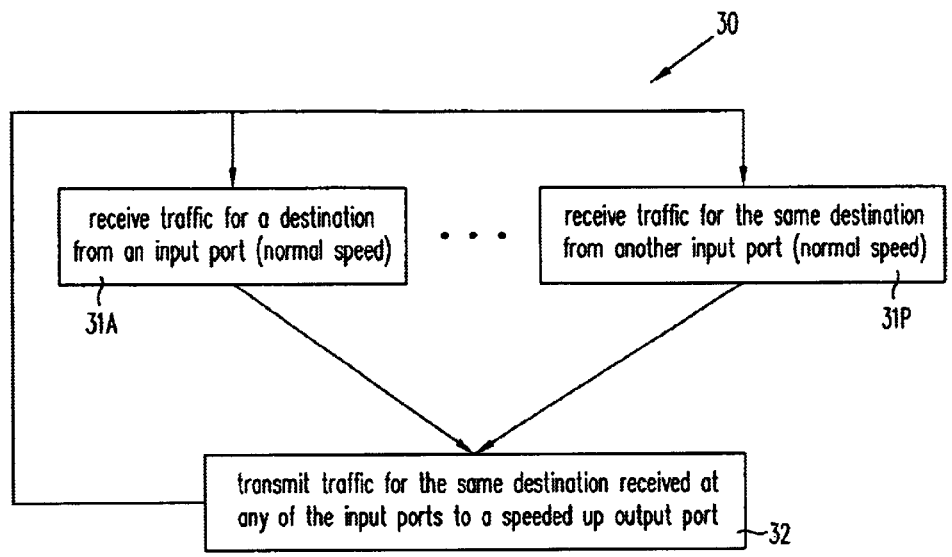
FIG. 1 illustrates, in high level flow chart, acts performed by a network that operates at normal speed in an earlier portion and that is speeded up in a later portion, in accordance with the invention.

A method in accordance with the invention, includes receiving (see act 31A in FIG. 1) traffic for a destination at an input port 111A (FIG. 2; wherein A ≦K ≦P, P being the total number of such input ports) at a first speed (also called "normal speed"), receiving (see act 31P in FIG. 1) traffic for the same destination at another input port 111 P (FIG. 2) also at the first speed, and transmitting (see act 32 in FIG. 1) at an output port 112K traffic traveling to the common destination at a second speed that is greater than the first speed. The combination of normal speed input ports 111A and 111P and speeded-up output port 112K allows a network 110 (FIG. 2) in accordance with the invention to reduce traffic contention when traffic traveling to a common destination is received at multiple input ports. Moreover, network (also called "differentially speeded-up network") 110 is cheaper than a prior art network that is speeded-up in input ports as well as in output ports.

System 100 (FIG. 2) that includes network 110 transfers information between a number of lines 102A–102P that are coupled to the external world (which can be, e.g. SONET OC192 trunks) in the normal manner (i.e., system 100 backwards compatible with other such systems for transferring information). System 100 includes a number of circuits 101A–101P (a total of P circuits which may be implemented in cards commonly referred to as "line cards"), and coupled thereto the just-described network 110. Network 110 has a number P of input ports (also called "network input ports") 111A–111P to receive traffic from the corresponding circuits 101A–101P, and also has the same number P of output ports (also called "network output ports") 112A–112P to supply traffic to circuits 101A–101P. Note that network 110 can be any kind of communications network such as a connection-oriented network (e.g. a circuit-switched network), or a connection-less network (e.g. a packet-switched or cell-switched network).

At least one (in one embodiment all) of output ports 112A–112P of network 110 is speeded-up, and has a greater capacity to carry traffic than any of input ports 111A–111P. Therefore, differentially speeded-up network 110 of this embodiment can simultaneously transmit on a speeded-up port 112K traffic that is received from two or more of input ports 111A–111P. In one example, output port (also called "network output port") 112K is speeded-up by a factor of six relative to the speed of input port 111K.

The speed-up of output port 112K can be implemented by having a single line connected between output port 112K and line card 101K, and clocking the single line at a rate faster than the corresponding rate of clocking of a line connected between an input port 111K and line card 101K. Alternatively, speed-up of network output port 112K can be implemented by providing therein a number of additional lines (not shown in FIG. 2) that are physically distinct but logically identical to each other (i.e. have the same address and are connected between the same port 112K and same line card 101K). At any given time, each line in a group of lines between port 112K and line card 101K carries traffic different from another line in the group, thereby to eliminate contention that would otherwise arise if there were only a single line in the group.

In the alternative implementation, the data transfer rate of output port 112K (that is dilated by use of multiple lines) is an integer multiple of the corresponding data transfer rate of each line. However, when the speed-up is implemented via clocking, the ratio of data transfer rates of an output port 112K and an input port 111K is not limited to integer and, instead, can be any real number greater than one (e.g. speed-up can be 6.5).

One example of line card 101K is described in "Cisco 12000 Series Gigabit Switch Router Asynchronous Transfer Mode Line Cards" available from Cisco Systems, Inc., 170 West Tasman Drive, San Jose, Calif. The just-described exemplary line card can be used in the normal manner, except that to support differential dilation of network 110 two or more input ports of the line card are coupled to output port 112K to support the greater than normal speed, while only one output port of the exemplary line card is coupled to input port 111K to support normal speed. Such coupling results in one or more input ports of the exemplary line card being left unused. Such unused ports can be eliminated from line card 101K (FIG. 2) by a person skilled in designing line cards, to reduce the cost of line cards used with differentially speeded-up network 110. Note that in each line card 101K, the memory used to buffer traffic from network 110 is greater than the memory used to buffer traffic being sent to network 110 (i.e., a majority of the memory is used at each egress port of system 100 rather than at each ingress port).

Figure 3:
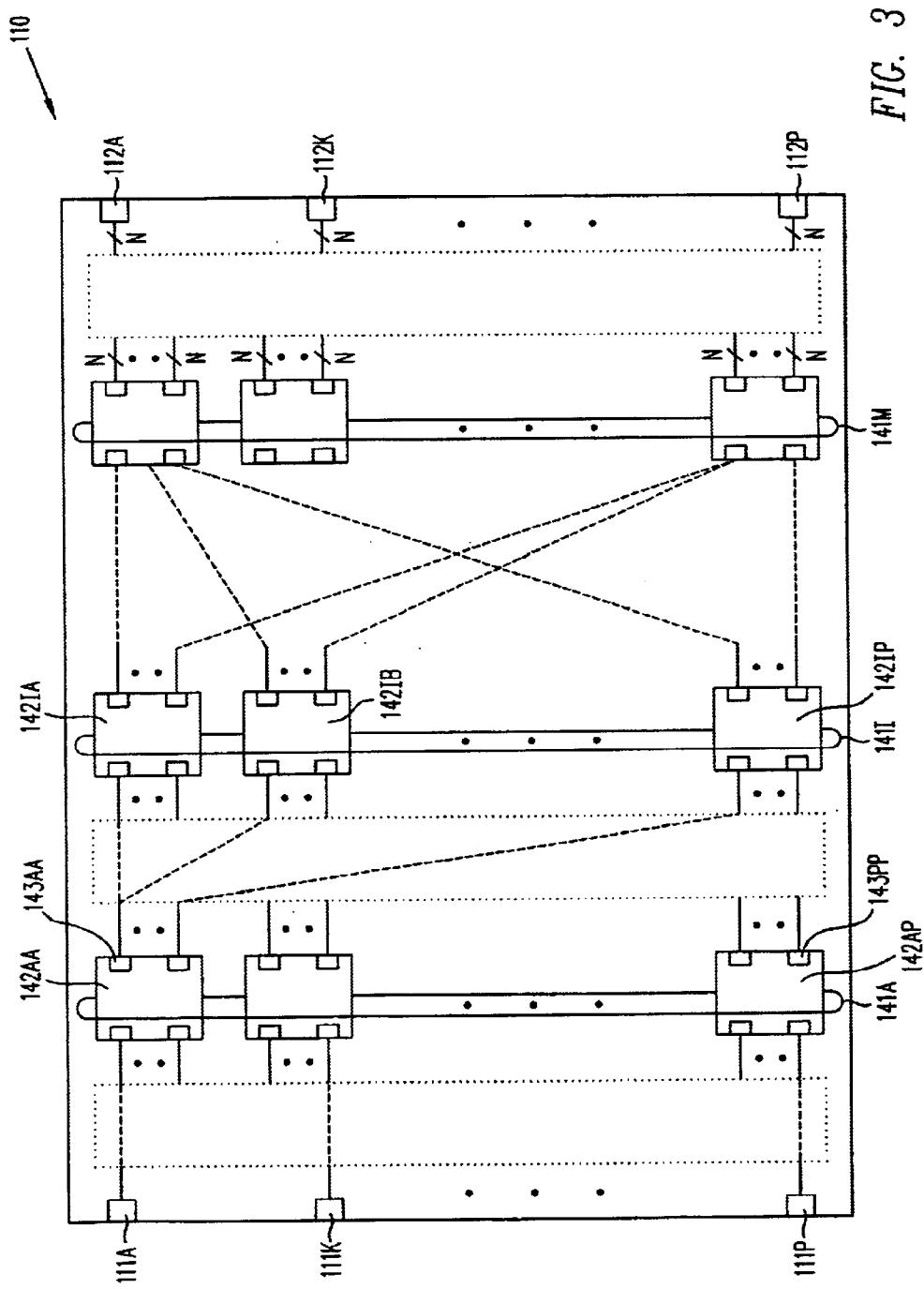
FIG. 3 illustrates, in an intermediate level block diagram, multiple stages and connections between the multiple stages within a partially-speeded-up MIN of the type illustrated in FIG. 2.
Figure 4:
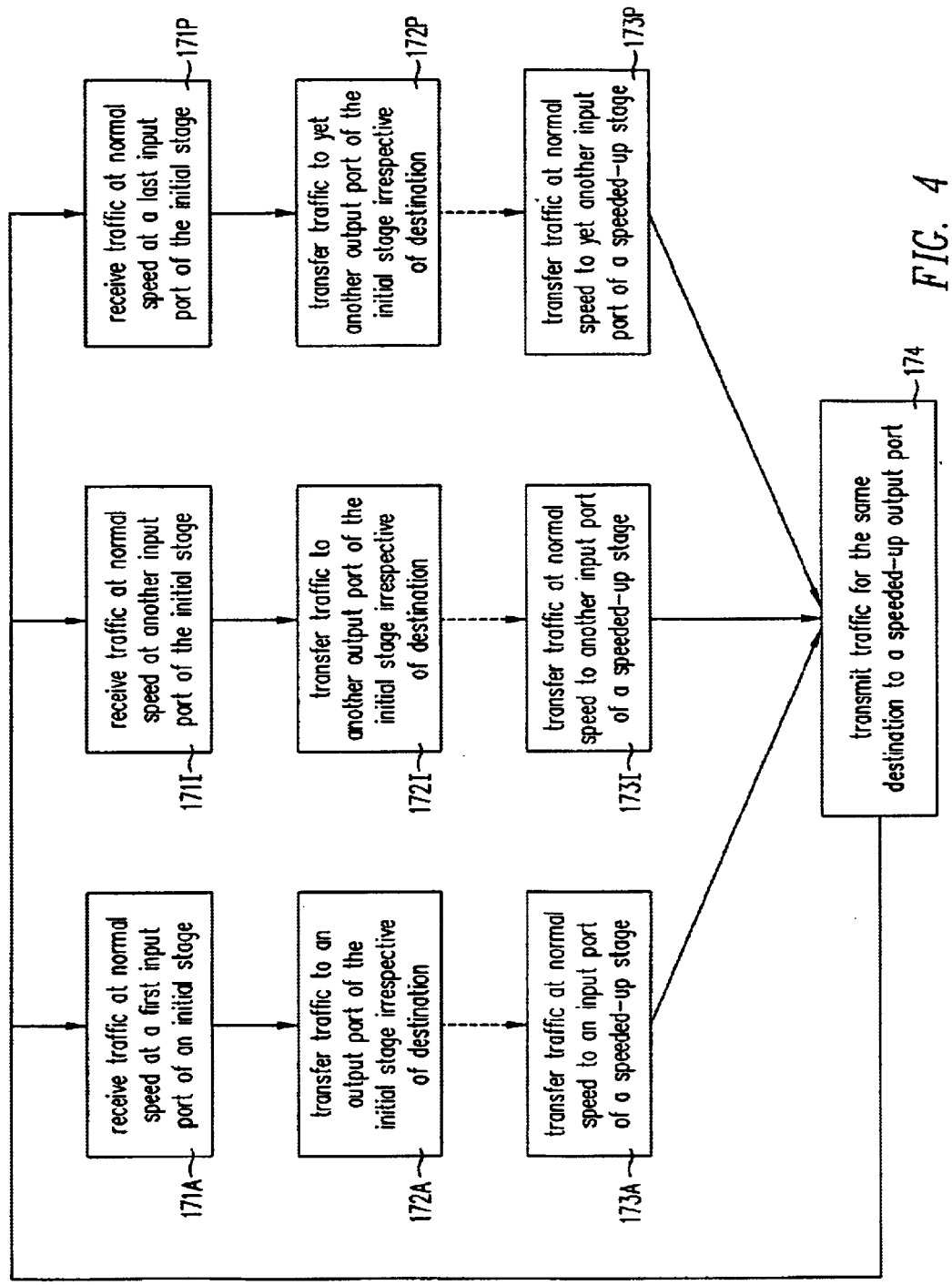
FIG. 4 illustrates, in an intermediate level flow chart, acts performed within the partially-speeded-up MIN illustrated in FIG. 3.

One embodiment of network 110 (also called "multistage interconnection network" and abbreviated as "MIN") 110 (see FIG. 3) includes therein a number of stages 141A–141M (wherein A ≦I ≦M, M being the total number of stages), wherein an initial stage 141A operates at normal speed, and a final stage 141M is speeded-up. Each stage 141I includes a number of network elements 142IA–142IP (P being the total number of network elements which is identical to the corresponding number P of network input ports 111A–111P and network output ports 112A–112P). Each of network elements 142AA–142AP of initial stage 141A (FIG. 3) receives information at input ports 111A–111P at normal speed (as illustrated by acts 171A–171P in FIG. 4), and transfers the received information to corresponding output ports 143AA–143PP regardless of destination (e.g. as illustrated by acts 172A–172P in FIG. 4) also at normal speed, primarily to balance load (e.g. to distribute the traffic evenly among network elements of a next stage).

Thereafter, the received information (also called "traffic") is transferred, as illustrated by acts 173A–173P (either directly or via an intermediate stage 141I depending on the embodiment) to a corresponding number of input ports (not labeled in FIG. 3) of final stage 141M. For example, links coupled to ports 143AA–143PP (FIG. 3) transfer traffic (again at normal speed) to the corresponding input ports (not labeled) of a speeded up stage 141I. Speeded up stage 141I transfers the received traffic to its output ports (also not labeled) at a greater than normal speed, as illustrated by act 174 in FIG. 4. Note, however, that depending on the embodiment, an intermediate stage 141I may not be present in MIN 110, and when present may not be speeded-up, in which case the above-described act 174 related to speed-up is performed in final stage 141M (e.g. in the case of a two stage network).

Figure 5:
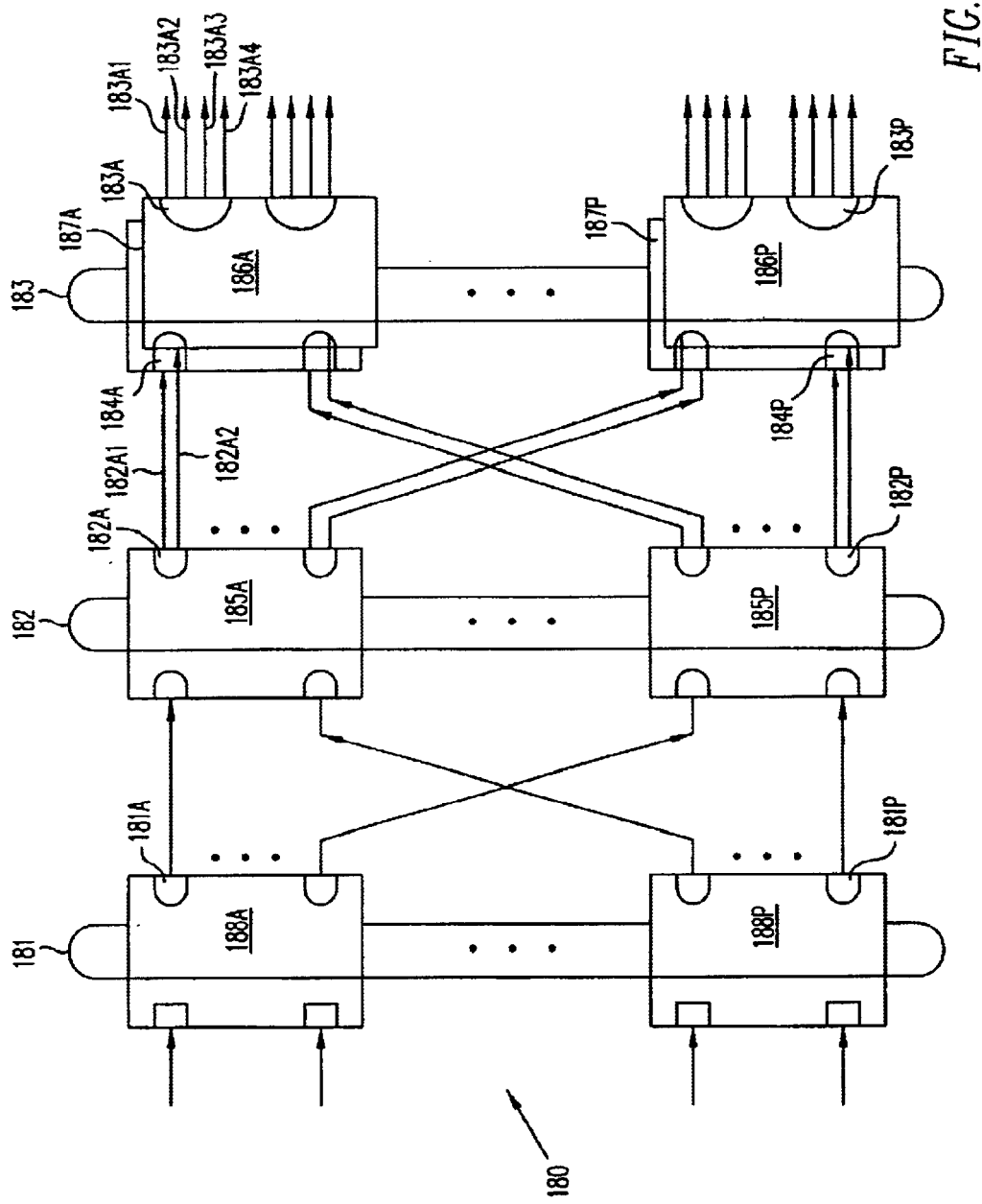
FIG. 5 illustrates, in an intermediate level block diagram, one embodiment of a three-stage MIN of the type illustrated in FIG. 4.

FIG. 5 illustrates "stage-specific dilation," wherein MIN 180 has been differentially speeded-up by dilation. Specifically, MIN 180 has three stages 181–183 that are each allocated a stage number in the range 0 to 2, and each stage has output ports dilated by a factor $d^I$ described above. Therefore, output ports 181A–181P of initial stage 181 are undilated (i.e. $2^0$ as I=0). Output ports 181A–181P of center stage 182 are dilated by a factor of two (i.e. $2^1$ as I=1), e.g. by providing two links 181A1 and 181A2 in port 182A. Output ports 183A–183D of final stage 183 of MIN 180 are dilated by a factor of four (i.e. $2^2$ as I=2), e.g. by providing four links 183A1–183A4 in port 183A. In addition input ports 184A–184P of stage 183 are also dilated by a factor of two (same as output ports of center stage 182 to accommodate one-to-one coupling thereto). Also, in this embodiment, three output ports of each line card 101K (FIG. 2) are left unused (or eliminated by design), as only one output port is used when using four input ports (to implement the 4:1 speed-up).

In one embodiment, stage specific dilation is implemented in a final stage 183 (FIG. 5) by use of twice the number of network elements (e.g. switches or routers) used in previous stage 182. In one example, stage 182 has four network elements 185A–185P, with each output port 183A–183P having twice the traffic capacity of each input port (not labeled). Stage 183 has eight network elements 186A–186P and 187A–187P, each of which is identical to each of network elements 185A–185P. Note that in stage 183 the network elements are used in pairs, e.g. 186A and 187A are both coupled to the respective links 182A1 and 182A2 of network element 185A of stage 182. Hence, port 184A of stage 183 includes the input ports (not labeled) of the respective network elements 186A and 187A.

Therefore, in network 180 of FIG. 5, the dilation factor in each of stages 181–183 is different, and increases in powers of 2 (although the factor can increase in powers of other numbers, depending on the implementation). Use of such "stage-specific dilation" provides additional hardware only in later stages where contention is expected, and therefore uses less hardware than otherwise required, for example if all stages are enlarged (dilated) ports.

Figure 2:
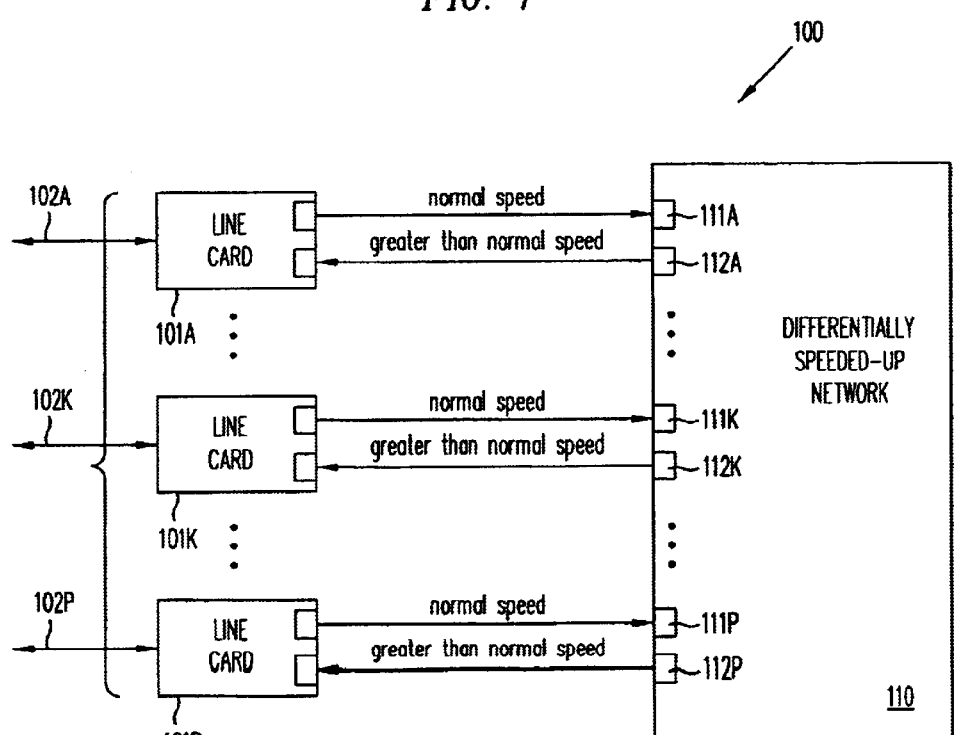
FIG. 2 illustrates, in a high level block diagram, a network having normal speed input ports and speeded-up output ports that performs the acts illustrated in FIG. 1, and connected to the network several line cards that transmit and receive traffic from the external world.

The value of a speed-up factor (in the above-described example illustrated in FIG. 5, the dilation factor) can be selected to be any number depending on the application. In making the selection, a skilled artisan could use the following principle: the probability of traffic from a number of input ports traveling to a common output port decreases as the number increases, for random traffic. For example, traffic from two or three input ports will occasionally travel to the same output port, whereas the likelihood of traffic from ten or twelve input ports traveling to the same output port is significantly smaller. Therefore, the speed-up factor can be selected within the range of 1–5, and preferably but not necessarily 2. Specifically, in the preferred embodiment illustrated in FIG. 5, a three-stage network has a speed-up factor of 2 in the second stage 182, and another speed-up factor of 2 in the third stage, thereby leading to and overall speed-up factor of 4 (e.g. receiving traffic at a normal speed of 16 gigabits per second at input ports 111A–111P and supplying traffic at a maximum speed of 64 gigabits per second at output ports 112A–112P as illustrated in FIG. 2).

In one implementation, each line in a dilated port is coupled to a respective one of different queues, as illustrated in FIG. 6A. Specifically, lines 182A1 and 182A2 of port 182A (FIG. 6A) are coupled to the respective queues Q1 and Q2 that hold different traffic, e.g. cell A and cell B, respectively. A switch control circuit 191 operates a switch 192 alternately uses queues Q1 and Q2 irrespective of the number of cells received in a given cell time. For example, when a single cell is received in the current cell time, switch control circuit 191 may cause the received cell to be stored in the first queue Q1.

Switch control circuit 191 also stores the identity of Q1 in a storage element 193 that holds the identity of the most recently used queue. Thereafter, in the next cell time, switch control circuit 191 reads the storage element 193, and decides to store the next cell in queue Q2, and thereafter updates storage element 193 with the identity of queue Q2. Note that when two cells are received in a given cell time, switch control circuit 191 stores the two cells in queues Q1 and Q2, and updates the storage element 193 with the identity of queue Q2. Therefore, in the next cell time, switch control circuit 191 stores the next cell in queue Q1.

In contrast, in a prior art fault tolerant network of the type illustrated in FIG. 6B, all cells are stored in a single queue Q0, and each cell is transmitted on two lines L1 and L2. Therefore, lines L1 and L2 of the prior art fault tolerant network carry the same traffic, whereas lines 182A1 and 182A2 carry different traffic.

As initial stage 181 is operated in the normal manner (i.e., at normal speed), network elements 188AA–188AP (FIG. 5) can be any network element commonly used in prior art networks, such as a crossbar switch or a shared memory switch, depending on the implementation.

In contrast, each of network elements 185A–185P, 186A–186P and 187A–187P is dilated by a dilation factor of two. One example of such a dilated network element is a crossbar switch 160 (FIG. 7A) that includes additional multiplexers (not labeled for clarity) that receive the same input signals as original multiplexers, and further includes a control circuit 161 that controls the two sets of multiplexers. For example, control circuit 161 causes two of the input signals received at two different input ports 163A and 163B to be supplied to the same output port 164A, although on two physically distinct links as described above in reference to FIG. 6A. Instead of two four-to-one multiplexers M1 and M2, a single eight-to-one multiplexer can be used.

Another example of such a dilated network element is a packet router 162 (FIG. 7B) that includes a two-to-eight demultiplexer 167. Demultiplexer 167 receives packets from shared memory 168, and is controlled by a control circuit 169 (as described above in reference to FIG. 6A) to transfer a packet to one of the output links (not labeled).

Numerous modifications and adaptations of differentially speeded-up network 110 illustrated in FIG. 2 would be apparent to the skilled artisan in view of the disclosure. For example, in one implementation, eight MINs of the type illustrated in FIG. 5 are used together.

Note also that although a specific MIN has been illustrated in FIG. 5, any MIN in the form of a Benes network can be speeded-up as described herein. Also, instead of differentially dilating an MIN that uses lines for transferring electrical signals, an MIN that uses optical signals can also be dilated, e.g. by use of optical signals of multiple wavelengths along a single path. Various such modifications and adaptations of the embodiments and implementations described herein are encompassed by the attached claims.

What is claimed is:

1. A switch fabric comprising:

a first stage including a plurality of first stage network elements, wherein each of the plurality of first stage network elements includes an undilated input port and an undilated output port;

a second stage including a plurality of second stage network elements, wherein each of the plurality of second stage network elements includes an undilated input port coupled to at least one undilated output port of the plurality of first stage network elements, and wherein each of the plurality of second stage network elements includes a first dilated output port; and a third stage including a first plurality of third stage network elements coupled in parallel with a second plurality of third stage network elements; wherein each of the first plurality of third stage network elements includes an undilated input port coupled to at least one first dilated output port of the plurality of second stage network elements; wherein each of the first plurality of third stage network elements includes a second dilated output port; wherein each of the second plurality of third stage network elements includes an undilated input port coupled to at least one first dilated output port of the plurality of second stage network elements; and wherein each of the second plurality of third stage network elements includes a third dilated output port.

2. The switch fabric of claim 1 further comprising:

a switch fabric output port coupled to at least one of the second dilated output ports and coupled to at least one of the third dilated output ports.

3. The switch fabric of claim 1 wherein each of the first dilated output ports, the second dilated output ports, and the third dilated output ports is configured to transmit data at a rate greater than a maximum transfer rate of the undilated input ports of the plurality of first stage network elements.

4. The switch fabric of claim 1 wherein each of the first dilated output ports, the second dilated output ports, and the third dilated output ports is configured to transmit data at a rate greater than a maximum transfer rate of the undilated input ports of the plurality of second stage network elements.

5. The switch fabric of claim 1 wherein at least one dilated output port is coupled to a first network link and a second network link.

* * * * *